United States Patent
Abdelghaffar et al.

(10) Patent No.: US 12,332,347 B2
(45) Date of Patent: Jun. 17, 2025

(54) METHOD FOR OPERATING RADAR SENSORS

(71) Applicant: Robert Bosch GmbH, Stuttgart (DE)

(72) Inventors: Ahmed Shaker Hamed Abdelghaffar, Heilbronn (DE); Jacopo Ventura, Augsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 342 days.

(21) Appl. No.: 17/893,419

(22) Filed: Aug. 23, 2022

(65) Prior Publication Data

US 2023/0075921 A1 Mar. 9, 2023

(30) Foreign Application Priority Data

Sep. 6, 2021 (DE) ...................... 10 2021 209 772.3

(51) Int. Cl.
*G01S 13/931* (2020.01)
*G01S 13/72* (2006.01)

(52) U.S. Cl.
CPC ............ *G01S 13/931* (2013.01); *G01S 13/72* (2013.01)

(58) Field of Classification Search
None
See application file for complete search history.

(56) References Cited

U.S. PATENT DOCUMENTS

| | | | |
|---|---|---|---|
| 9,575,160 B1* | 2/2017 | Davis | G01S 7/35 |
| 9,599,702 B1* | 3/2017 | Bordes | G01S 13/18 |
| 10,789,839 B2* | 9/2020 | Kawai | G08G 1/166 |
| 2010/0033364 A1* | 2/2010 | Kishida | G01S 13/584 |
| | | | 342/70 |
| 2014/0313070 A1* | 10/2014 | Asanuma | G01S 7/41 |
| | | | 342/200 |
| 2018/0090006 A1* | 3/2018 | Ikenouchi | G01S 7/003 |
| 2018/0203107 A1* | 7/2018 | Asanuma | G01S 7/415 |
| 2019/0084566 A1* | 3/2019 | Park | G05D 1/0287 |
| 2020/0271757 A1* | 8/2020 | Mardani | G01S 7/415 |
| 2020/0353919 A1* | 11/2020 | Kawabata | G01S 15/93 |
| 2021/0080558 A1* | 3/2021 | Gosala | G01S 13/931 |
| 2021/0247509 A1* | 8/2021 | Anno | G01S 13/584 |
| 2021/0302570 A1* | 9/2021 | Ichiki | G01S 7/41 |

* cited by examiner

*Primary Examiner* — Marcus E Windrich
(74) *Attorney, Agent, or Firm* — NORTON ROSE FULBRIGHT US LLP

(57) ABSTRACT

A method for operating radar sensors in a vehicle. At the outset, the acquired targets are divided into stationary targets and moving targets. The moving targets are then divided into primary targets, whereof the distances from the vehicle are less than a pre-definable threshold value, and secondary targets, whereof the distances from the vehicle are greater than a threshold value. The primary targets are fed to a first tracking device, which ascertains the states of the primary targets. The secondary targets are fed to a second tracking device, which ascertains the states of the secondary targets. The second tracking device carries out a computationally less powerful ascertainment of the states than the first tracking device.

8 Claims, 2 Drawing Sheets

METHOD FOR OPERATING RADAR SENSORS

CROSS REFERENCE

The present application claims the benefit under 35 U.S.C. § 119 of German Patent Application No. DE 10 2021 209 772.3 filed on Sep. 6, 2021, which is expressly incorporated herein by reference in its entirety.

FIELD

The present invention relates to a method for operating radar sensors in a vehicle. Furthermore, the present invention relates to a computer program, which executes each step of the method when run on a computing unit, and a machine-readable storage medium, which stores the computer program. The present invention also relates to an electronic control unit, which is equipped to execute the method according to the present invention.

BACKGROUND INFORMATION

Radar systems for measuring states of targets, i.e. their distance, relative speed and angle, orientation and size, are increasingly used for safety and comfort functions in motor vehicles. In this case, the targets, after their detection, are typically classified into stationary targets and moving targets. The targets are then fed to an individual tracking device (also known as a tracker), which ascertains the state of the target.

The tracking device is typically a Kalman filter, which offers a simple and favorable method for ascertaining the state from the radar measurement in real time. However, this does not meet the accuracy requirements when ascertaining the state for autonomous driving according to level 2 or above, especially when driving on expressways (freeways) and in cities. For example, in Kalman filtering, two targets which overlap or are close to one another are often merged into a single target due to the low accuracy.

As alternatives, more complex methods, such as an extended object tracking algorithm (ETO) and/or a random finite set algorithm (RFS), are implemented by the tracking device. These algorithms meet the accuracy requirements, but, due to their complexity, are not suitable for ascertaining the states of all targets when driving on expressways and in cities when they are run on a conventional electronic control unit with moderate computing power. In these scenarios, it is not sufficient to reduce the targets to be analyzed to moving targets for the said algorithms.

SUMMARY

According to the present invention, a method for operating radar sensors in a vehicle is provided. According to an example embodiment of the present invention, targets are acquired by the radar sensors of the vehicle. For this purpose, a semantic segmentation of the radar measurements may be implemented. The acquired targets are divided into stationary targets and moving targets. For the moving targets, the distances from the vehicle are then ascertained. Since the distances are ascertained by the radar sensors of the vehicle, the distances from the vehicle may also be interpreted as distances between the respective moving target and a radar sensor or a combination of a plurality of radar sensors of the vehicle. The moving targets are classified into primary targets, whereof the distances from the vehicle are less than a pre-definable threshold value, and secondary targets, whereof the distances from the vehicle are greater than the threshold value. The division may already be carried out during the semantic segmentation of the radar measurements. This division results in the moving targets being categorized into relevant targets—namely the primary targets—and less relevant targets—namely the secondary targets—in terms of their respective distance from the vehicle.

Two different tracking devices (also known as trackers) are provided to ascertain the states of the targets, which tracking devices, in particular, use different algorithms to ascertain the states. The states of targets are characterized in particular by their distance, relative speed and angle with respect to the vehicle and by their orientation and size.

The primary targets are fed to a first tracking device. This first tracking device ascertains the states of the primary targets as precisely as possible. Such precise ascertainment is typically associated with high computational expenditure. By way of example, the first tracking device implements an extended object tracking algorithm (ETO) and/or a random finite set algorithm (RFS).

The secondary targets are fed to a second tracking device. This second tracking device carries out simple ascertainment of the states of the secondary targets. In this case, the ascertainment of the states by the second tracking device is less intensive in terms of computing power than the ascertainment of the states which is carried out by the first tracking device. The second tracking device preferably implements a less complex algorithm than the first tracking device. By way of example, the second tracking device implements Kalman filtering.

As a result, the division ensures that only some of the targets, namely the primary targets, which represent relevant targets due to their distance from the vehicle, are processed by the first tracking device, which is notable for high accuracy and high computational expenditure during the ascertainment. Processing targets in the vicinity of the vehicle with high accuracy is a prerequisite for autonomous driving according to level 2 or above, especially in the case of passing maneuvers and collision avoidance maneuvers. Secondary targets, which represent less relevant targets due to their distance from the vehicle, are implemented only by the second tracking device, with less accuracy and consequently less computational expenditure. The number of targets which need to be processed with high computational expenditure is thus reduced. Accordingly, the total computational expenditure of the electronic control unit is significantly reduced and the ascertainment may be carried out more quickly. As a result, the states of all moving targets may also be ascertained completely in real time by an electronic control unit with limited computing power.

Moreover, a suitable division of the moving targets enables resource management between the first tracking device and the second tracking device. In addition, the threshold value for the distance may be selected according to the computing power of the control unit used, and a correspondingly greater or smaller number of primary targets may be processed. A scaling of the target ascertainment for low-power electronic control units through to high-power electronic control units is possible.

Moreover, according to an example embodiment of the present invention, obstacle targets may be detected from the acquired targets. Obstacle targets are targets which represent an obstacle for the vehicle, i.e., which are located, in particular, in the path of the vehicle and/or on a planned trajectory for the vehicle. For this purpose, the boundaries of a road are ascertained from the stationary targets. Such stationary targets are, for example, road boundary posts, guard railings, trees, parked vehicles etc. Consequently, the road is defined as a surface within the ascertained boundaries. Stationary targets which are located within the boundaries of the road are now detected as an obstacle for the vehicle and therefore identified as obstacle targets. The identification of the obstacle targets may furthermore take place during the semantic segmentation. Stationary targets which are located on the road always represent a major hazard for the vehicle, regardless of their distance, so obstacle targets are likewise relevant targets for the vehicle. The obstacle targets, together with the primary targets, are now fed to the first tracking device, which ascertains the states of the obstacle targets as precisely as possible. As a result, obstacles on the road are detected with high accuracy.

According to an example embodiment of the present invention, if the boundaries of the road are ascertained from the stationary targets, it may be provided that moving targets which are located outside the boundaries of the road are excluded from the evaluation and should not be fed to any of the tracking devices. At intersections, secondary roads are likewise located within the boundaries. Moving targets outside the boundaries of the road are disturbance data (also known as clutter) and are therefore irrelevant, so may be excluded.

The boundaries of the road may be ascertained for each side in relation to the vehicle, i.e. for the left side and for the right side as seen from the vehicle. The above-mentioned steps of the method, which are based on the boundaries of the road—i.e. the identification of the obstacle targets and/or the exclusion of the moving targets which are located outside the boundaries of the road—may then be carried out separately for each side.

The threshold value may be selected depending on many factors. In order to be able to differentiate between relevant and less relevant targets based on the distance, the path between the vehicle and the target is of importance. The threshold value may preferably be defined as a function of the intrinsic speed of the vehicle and the braking time. The braking time is, inter alia, dependent on the vehicle, the intrinsic speed thereof, the road surface, the weather conditions and, in the case of manual and partly automated driving, the reaction time of the driver. The braking time may be calculated using conventional methods, or it may be present as a characteristic curve/characteristic map in the electronic control unit of the vehicle. The threshold value may also be present as a characteristic curve/characteristic map in the electronic control unit.

According to an example embodiment of the present invention, the computer program is equipped to carry out each step of the method, in particular when executed on a computing unit or control unit. It enables the implementation of the method in a conventional electronic control unit without having to make structural changes thereto. To this end, it is stored on the machine-readable storage medium.

By installing the computer program on a conventional electronic control unit, the resultant electronic control unit is equipped to operate the radar sensors.

BRIEF DESCRIPTION OF THE DRAWINGS

Exemplary embodiments of the present invention are depicted in the drawings and explained in more detail in the description below.

DETAILED DESCRIPTION OF EXAMPLE EMBODIMENTS

Figure 1:
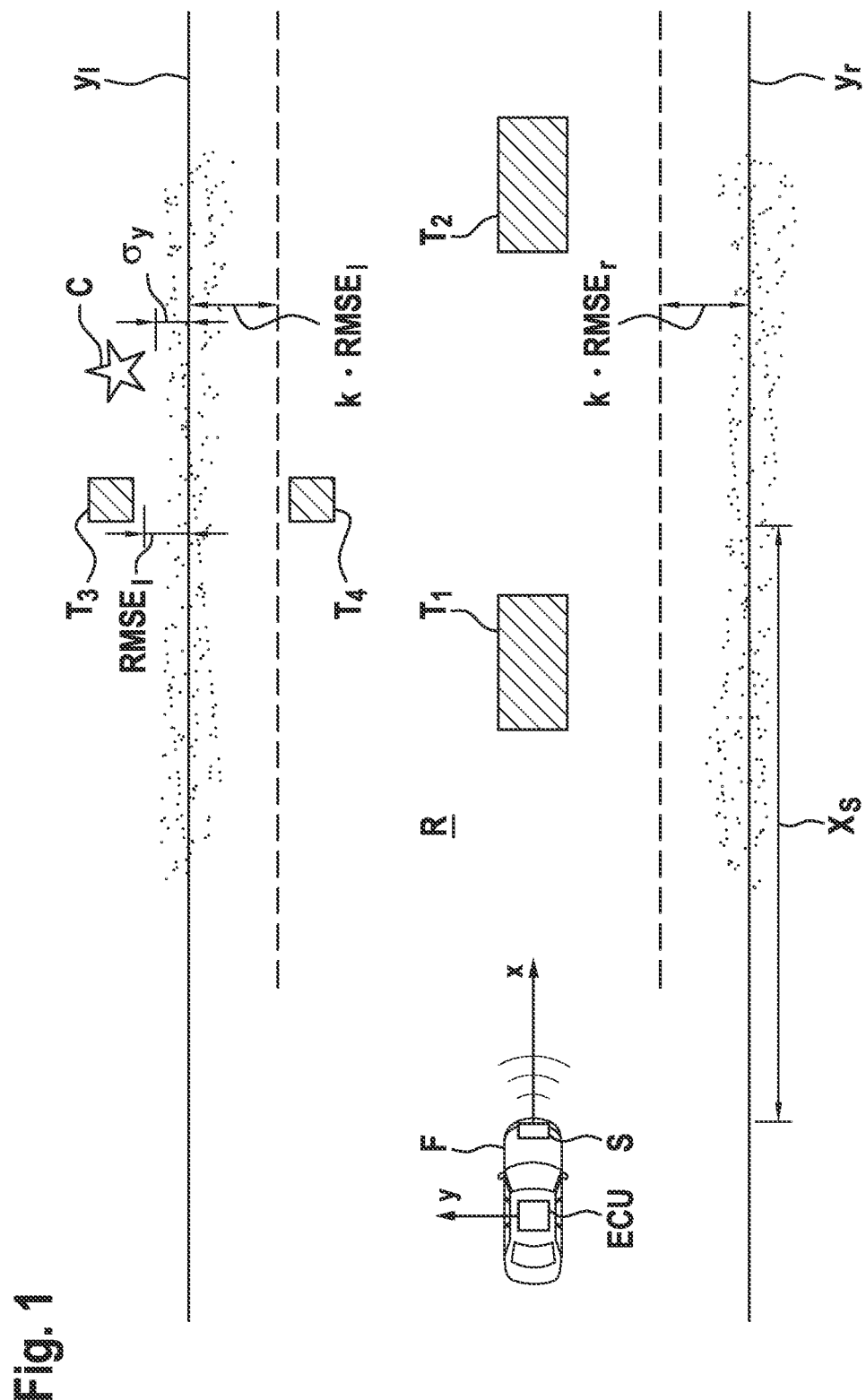
FIG. 1 shows a schematic view of a vehicle with a radar sensor in a coordinate system.

FIG. 1 shows a vehicle F with a radar sensor S. The vehicle F has, in addition, an electronic control unit ECU, which is connected to the radar sensor S. A two-dimensional Cartesian coordinate system with an X axis and a Y axis is moreover depicted. The vehicle F is aligned along the X axis and moves along this axis on a road R. The exemplary radar sensor S is aligned in the direction of travel and therefore likewise in the direction of the X axis. Further radar sensors may also be provided, or the radar sensor may be in a different position and/or have a different orientation. In addition, as an example, four targets $T_1$-$T_4$ are depicted, of which three targets $T_1$ to $T_3$ are moving and one target $T_4$ is stationary. The target $T_1$ is located in the vicinity of the vehicle F on the road R and should be rated as relevant, and the target $T_2$ is likewise located on the road R, but far away from the vehicle F, and should be rated as less relevant. Since the target $T_4$ is a stationary target which is located on the road R, it should generally be rated as relevant. Furthermore, variables which are used for the exemplary embodiment, described below, of the method according to the invention are depicted in FIG. 1.

Figure 2:
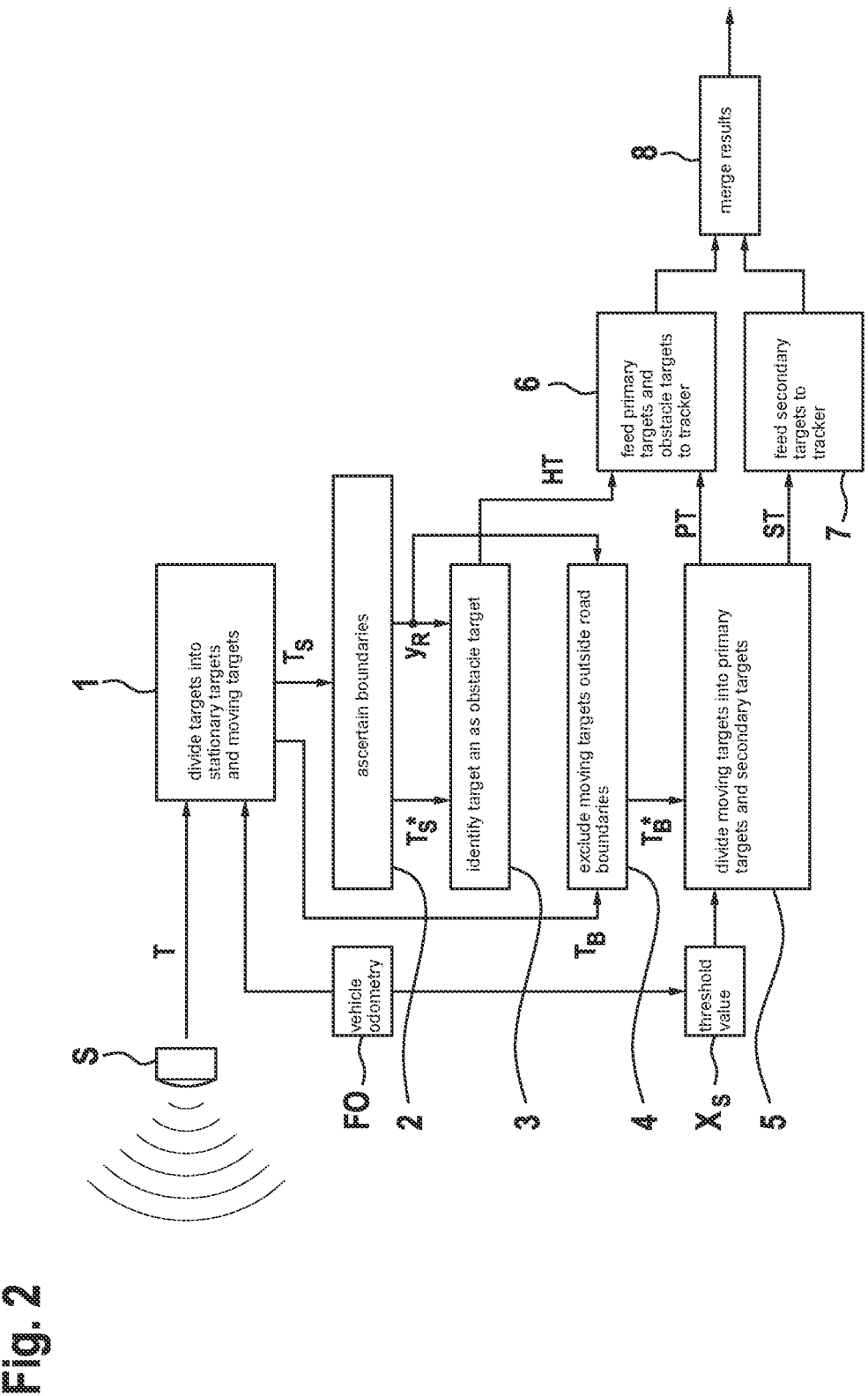
FIG. 2 shows a flow chart of an exemplary embodiment of the method according to the present invention.

FIG. 2 shows a flow chart of an exemplary embodiment of the method according to the invention. The method is carried out by the electronic control unit ECU of the vehicle. At the outset, the targets T are received by the sensor S. The targets T are divided 1 into stationary targets $T_S$ and moving targets $T_B$. For this purpose, the speed of each target is compared to the intrinsic speed of the vehicle and the difference is calculated. The intrinsic speed of the vehicle is obtained from the vehicle odometry FO. If the difference between the speeds is greater than a speed threshold value, then the target T is a moving target $T_B$. If the difference between the speeds is less than, or equal to, the speed threshold value, then the target T is a stationary target $T_S$.

The boundaries $y_R$ of the road R on which the vehicle F moves are then ascertained 2 from the stationary targets $T_S$. In this case, the boundaries $y_R$ of the road R depend on the distance in the X direction, i.e. $y_R(x)$ applies. This is particularly relevant for curves. In the exemplary embodiment described here, the road boundaries $y_R(x)$ are calculated separately for each side of the road R, i.e. the left road boundary $y_l(x)$ and the right road boundary $y_r(x)$ are ascertained 2. For this purpose, the stationary targets $T_S$ are divided into right and left according to their position in relation to the vehicle. Stationary targets $T_S$ on the left have a Y value of greater than 0 in the coordinate system of FIG. 1, and stationary targets $T_S$ on the right have a Y value of less than or equal to 0. For each side (right and left), disturbance data C (also known as clutter) are removed for the stationary targets $T_S$. Disturbance data represent first-order extreme values and/or satisfy the condition $|y-y_m|>k_1\sigma_y$, $y_m$ being the mean of the Y values on the respective side, $\sigma_y$ the standard deviation of the Y values on the respective side and $k_1$ a proportionality factor, e.g. 2.5. In FIG. 1, clutter C, which is outside the standard deviation $\sigma_y$, is shown by way of example for the left side. Finally, the road boundary $y_l(x)$, $y_r(x)$ is ascertained for each side. The boundary $y_R$ may be ascertained by curve fitting. By way of example, a second-order polynomial may be used for the curve fitting. This is particularly suitable in the case of relatively straight roads, such as, e.g., an expressway (freeway), and requires relatively little computational expenditure. In the case of roads which have many curves, as is normal, e.g., in cities, a base spline (B spline) is used in the curve fitting.

When ascertaining 2 the boundaries $y_R$ of the road R, it may be provided that, if the method is repeated in closed loops, previously ascertained road boundaries $y_R$ are used. The road boundaries $y_l$ and $y_r$ may also be ascertained separately for each side, left and right, here. Stationary targets $T_S$ close to the road boundaries $y_R$ are then selected and the curve fitting is implemented at these points. If a new curve differs greatly from the previously used curve (i.e. their coefficients differ), the new curve is rejected and the previously ascertained curve is used instead.

In other exemplary embodiments, when ascertaining 2 the boundaries $y_R$ of the road R, a clustering algorithm may be implemented. In this case, the stationary targets $T_S$ are not divided into right and left. Curve fitting is implemented for each cluster here and a curve is ultimately applied in each case as a road boundary $y_R$ for each side (right and left).

The position of the stationary targets $T_S$* which are extricated from the disturbance data is now investigated with regard to the road boundaries $y_R$. If the stationary target $T_S$* is located between the road boundaries $y_R$, i.e. $|y|<|y_R|$ applies, and if it is far enough away from each of the boundaries $y_R$ of the road R, i.e. $|y-y_R|>k_2$ RMSE applies, RMSE being the root of the mean squared error and $k_2$ being a further proportionality factor, e.g. 1.8, then the stationary target $T_S$* is identified 3 as an obstacle target HT on the road R. As described above, the boundaries $y_R$ of the road R depend on the distance in the X direction on the one hand and are split into the sides left and right on the other. Therefore, to identify 3 an obstacle target HT, the following conditions apply for the left side: $y<y_l(x)$ and $|y-y_l(x)|>k_2$ RMSE$_l$, RMSE$_l$ being the root of the mean squared error of the Y values on the left side, and the following conditions apply for the right side: $y>y_r(x)$ and $|y-y_r(x)|>k_2$ RMSE$_r$, RMSE$_r$ being the root of the mean squared error of the Y values on the right side. In FIG. 1, the target $T_4$ has the coordinates $(x_4, y_4)$. The following apply: $y_4<y_l(x_4)$ and $y_4>y_r(x_4)$ and therefore $|y_1|<|y_R(x_4)|$, and $|y_4-y_l(x_4)|>k_2$ RMSE$_l$ and $|y_4-y_r(x_4)|>k_2$ RMSE$_r$ and therefore $|y_4-y_R(x_4)|>k_2$ RMSE. The target $T_4$ therefore satisfies the above-mentioned conditions and is identified 3 as obstacle target HT.

The ascertained boundaries $y_R$ of the road R are, in addition, used to remove disturbance data from the moving targets $T_B$. If the moving target $T_B$ is located outside the road boundaries $y_R$, i.e. $|y|>|y_R|$ applies, and if it is far enough away from each of the boundaries $y_R$ of the road R, i.e. $|y-y_R|>k_3$ RMSE applies, RMSE being the root of the mean squared error and $k_3$ being a further proportionality factor, e.g. 1, then the moving target $T_B$ is excluded 4. In this case, the boundaries $y_R$ of the road R also depend on the distance in the X direction on the one hand and are split into the sides left and right on the other. Therefore, to exclude 4 the moving targets $T_B$, the following conditions apply for the left side: $y>y_l(x)$ and $|y-y_l(x)|>k_3$ RMSE$_l$, RMSE$_l$ being the root of the mean squared error of the Y values on the left side, and the following conditions apply for the right side: $y<y_r(x)$ and $|y-y_r(x)|>k_3$ RMSE$_r$, RMSE$_r$ being the root of the mean squared error of the Y values on the right side. In FIG. 1, the moving target $T_3$ has the coordinates $(x_3, y_3)$ at the time of measurement. The following apply: $y_3>y_l(x_3)$ and therefore $|y_3|>|y_R(x_3)|$, and $|y_3-y_l(x_3)|>k_3$ RMSE$_l$. The target $T_4$ therefore satisfies the above-mentioned conditions and is excluded 4.

The moving targets $T_B$* which are extricated from the disturbance data are divided 5 into primary targets PT and secondary targets ST based on their distance from the vehicle F. For the division, a threshold value $X_S$ is defined for the distance between the vehicle F and the moving target $T_B$*. Since the distance is ascertained by the radar sensor S of the vehicle F, the distance between the vehicle F and the moving target $T_B$* may also be interpreted as the distance between the radar sensor S of the vehicle and the moving target $T_B$*. The threshold value $X_S$ is calculated as the product of the intrinsic speed of the vehicle and the braking time. The intrinsic speed of the vehicle is in turn obtained from the vehicle odometry FO. The braking time may be ascertained using conventional methods and it may be present in the electronic control unit ECU of the vehicle F. If a moving target $T_B$* is located at a distance from the vehicle F which is less than the threshold value $X_S$, then this moving target $T_B$* is classified as a primary target PT. In FIG. 1, this is the case for the target $T_1$. If a moving target $T_B$* is located at a distance from the vehicle F which is greater than the threshold value $X_S$, then this moving target $T_B$* is classified as a secondary target ST. In FIG. 1, this is the case for the target $T_2$.

In further exemplary embodiments, the moving targets $T_B$* are combined into clusters during the division 5. The following applies analogously to the division 5 for individual targets: The moving targets $T_B$*, which form a single cluster, are primary targets PT if each moving target $T_B$* of the cluster is located at a distance from the vehicle F which is less than the threshold value $X_S$. On the other hand, the moving targets $T_B$*, which form a single cluster, are secondary targets ST if each moving target $T_B$* of the cluster is located at a distance from the vehicle F which is greater than the threshold value $X_S$.

The primary targets PT and the obstacle targets HT are fed to a first tracking device (tracker) 6. The first tracking device 6 implements an extended object tracking algorithm (ETO) and/or a random finite set algorithm (RFS), and thus ascertains the states of the primary targets PT and the obstacle targets HT with high accuracy. The secondary targets ST are fed to a second tracking device 7. The second tracking device 7 implements a simple Kalman filtering and thus ascertains the states of the secondary targets ST with less accuracy, but also with less computing expenditure. Finally, the results from the tracking devices 6 and 7 are merged 8 to acquire objects.

What is claimed is:

1. A method for operating radar sensors in a vehicle, comprising the following steps:
   obtaining radar signals by which present targets are detected;
   in a first division, dividing at least a first subset of the detected targets, based on respective distances of the at least the first subset of the detected targets from the vehicle, into primary targets whose respective distances from the vehicle are all less than a threshold value, and secondary targets whose respective distances from the vehicle are all not less than the threshold value;
   feeding the primary targets to a first tracking processing, which ascertains states of the primary targets; and
   feeding the secondary targets to a second tracking processing, which ascertains the states of the secondary targets by carrying out a less computing power-intensive ascertainment of the states than the first tracking device;
   wherein the method further includes at least one of the following three features (I)-(III):

(I) the threshold value is dynamically set as a function of a current intrinsic speed of the vehicle and a current braking time of the vehicle;
(II) the first tracking processing implements an extended object tracking algorithm and/or a random finite set algorithm, and the second tracking processing implements a Kalman filtering and not the extended object tracking algorithm and/or random finite set algorithm; and
(III) the method further comprises:
in a second division, dividing the detected targets into (i) the first subset of targets, which are classified by the second division as being moving targets, and (ii) a second subset of targets, which are classified by the second division as being stationary targets;
based on the second division, using a combination of, selectively, the detected targets of the second subset to identify boundaries of a road;
based on the identification of the boundaries, determining, for each of one or more of the targets, whether the respective target is within the identified boundaries; and
based on the determination and based on the second division, subjecting, selectively those of the second subset of the second subset of targets that are within the boundaries to the first tracking processing irrespective of the threshold value.

2. The method as recited in claim 1, wherein the method further comprises:
the step of, in the second division, dividing the detected targets into (i) the first subset of targets, which are classified by the second division as being moving targets, and (ii) the second subset of targets, which are classified by the second division as being stationary targets;
the step of, based on the second division, using a combination of, selectively, the detected targets of the second subset to identify boundaries of a road;
based on the identification of the boundaries, determining, for each of one or more of the targets, whether the respective target is located within the identified boundaries of the road; and
based on the determination and based on the second division, subjecting, selectively those of the second subset of targets that are within the boundaries to the first tracking processing irrespective of the threshold value.

3. The method as recited in claim 2, wherein those of the moving targets located outside the boundaries of the road are not fed to the first tracking processing and are note fed to the second tracking processing.

4. The method as recited in claim 2, wherein the boundaries of the road are ascertained for each side in relation to the vehicle and the steps of the method which are based on the boundaries of the road are carried out separately for each side.

5. The method as recited in claim 1, wherein the first tracking processing implements the extended object tracking algorithm and/or a random finite set algorithm, and the second tracking processing implements the Kalman filtering and not the extended object tracking algorithm and/or random finite set algorithm.

6. The method as recited in claim 1, wherein the threshold value is dynamically set as a function of the current intrinsic speed of the vehicle and the current braking time of the vehicle.

7. A non-transitory machine-readable storage medium on which is stored a computer program for operating radar sensors in a vehicle, the computer program, when executed by a computer, causing the computer to perform a method that includes the following steps:
obtaining radar signals by which present targets are detected;
in a first division, dividing at least a first subset of the detected targets, based on respective distances of the at least the first subset of the detected targets from the vehicle, into primary targets whose respective distances from the vehicle are all less than a threshold value, and secondary targets whose respective distances from the vehicle are all not less than the threshold value;
feeding the primary targets to a first tracking processing, which ascertains states of the primary targets; and
feeding the secondary targets to a second tracking processing, which ascertains the states of the secondary targets by carrying out a less computing power-intensive ascertainment of the states than the first tracking device;
wherein the method further includes at least one of the following three features (I)-(III);
(I) the threshold value is dynamically set as a function of a current intrinsic speed of the vehicle and a current braking time of the vehicle;
(II) the first tracking processing implements an extended object tracking algorithm and/or a random finite set algorithm, and the second tracking processing implements a Kalman filtering and not the extended object tracking algorithm and/or random finite set algorithm; and
(III) the method further comprises:
in a second division, dividing the detected targets into (i) the first subset of targets, which are classified by the second division as being moving targets, and (ii) a second subset of targets, which are classified by the second division as being stationary targets;
based on the second division, using a combination of, selectively, the detected targets of the second subset to identify boundaries of a road;
based on the identification of the boundaries, determining, for each of one or more of the targets, whether the respective target is within the identified boundaries; and
based on the determination and based on the second division, subjecting, selectively those of the second subset of the second subset of targets that are within the boundaries to the first tracking processing irrespective of the threshold value.

8. An electronic control unit configured to operating radar sensors in a vehicle, the electronic control unit configured to:
obtain radar signals by which present targets are detected;
in a first division, divide at least a first subset of the detected targets, based on respective distances of the at least the first subset of the detected targets from the vehicle, into primary targets whose respective distances from the vehicle are all less than a threshold value, and secondary targets whose respective distances from the vehicle are all not less than the threshold value;
feed the primary targets to a first tracking processing, which ascertains states of the primary targets; and
feed the secondary targets to a second tracking processing, which ascertains the states of the secondary targets by carrying out a less computing power-intensive ascertainment of the states than the first tracking device;

wherein the electronic control unit further includes at least one of the following three features (I)-(III):

(I) the threshold value is dynamically set as a function of a current intrinsic speed of the vehicle and a current braking time of the vehicle;

(II) the first tracking processing implements an extended object tracking algorithm and/or a random finite set algorithm, and the second tracking processing implements a Kalman filtering and not the extended object tracking algorithm and/or random finite set algorithm; and (III) the electronic control unit is further configured to:
in a second division, divide the detected targets into (i) the first subset of targets, which are classified by the second division as being moving targets, and (ii) a second subset of targets, which are classified by the second division as being stationary targets;

based on the second division, use a combination of, selectively, the detected targets of the second subset to identify boundaries of a road;

based on the identification of the boundaries, determine, for each of one or more of the targets, whether the respective target is within the identified boundaries; and based on the determination and based on the second division, subject, selectively those of the second subset of the second subset of targets that are within the boundaries to the first tracking processing irrespective of the threshold value.

* * * * *